Aug. 1, 1950     J. T. MARSHALL ET AL     2,517,008
FUEL INJECTION PUMP

Filed Jan. 24, 1947     6 Sheets-Sheet 4

INVENTORS
JOHN T. MARSHALL
HOWARD S. BOWER
BY
ATTORNEY

Aug. 1, 1950   J. T. MARSHALL ET AL   2,517,008
FUEL INJECTION PUMP

Filed Jan. 24, 1947   6 Sheets-Sheet 5

INVENTORS
JOHN T. MARSHALL
HOWARD S. BOWER
BY
ATTORNEY

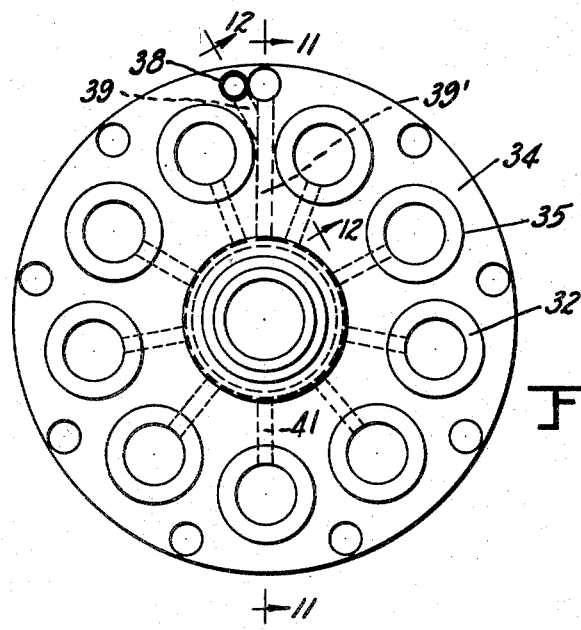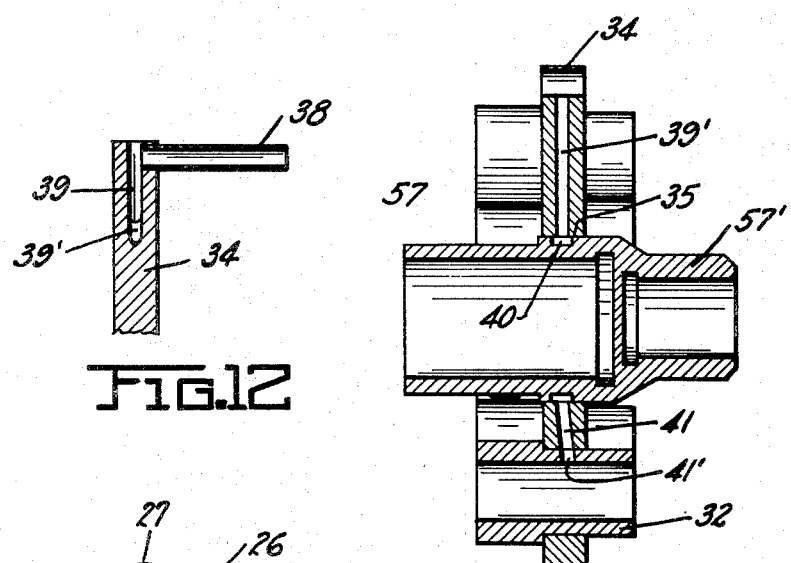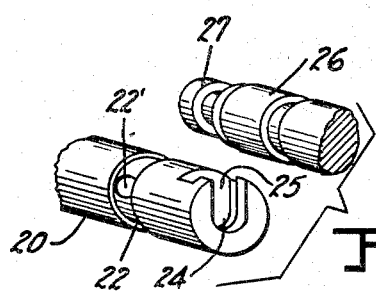

Patented Aug. 1, 1950

2,517,008

UNITED STATES PATENT OFFICE 2,517,008

FUEL INJECTION PUMP

John T. Marshall and Howard S. Bower, South Bend, Ind., assignors to Bendix Aviation Corporation, South Bend, Ind., a corporation of Delaware Application January 24, 1947, Serial No. 724,154

10 Claims. (Cl. 103—173)

This invention relates to fuel injection or high pressure supply pumps of the type disclosed in the copending application of LeRoy J. Evans, Serial No. 475,783, filed February 13, 1943, now Patent No. 2,447,268, granted August 17, 1948, and an object of the same is to simplify and reduce the size and weight of such pumps without sacrificing operating efficiency.

Another object is to provide a pump having vital moving elements, such as pumping plungers and associated parts which operate under close tolerances, wherein danger of "sticking" of one or more of the vital elements is reduced to a minimum.

Another object is to reduce the weight of fuel injection pumps, particularly those used in aircraft power plants, while at the same time maintaining a safe margin of strength and endurance.

A further and more specific object is to improve the plunger and tappet assembly of pumps of the type specified.

A still further object is to generally improve fuel injection pumps.

The foregoing and other objects and advantages will become apparent in view of the following description taken in conjunction with the drawings, wherein.

Figure 1:
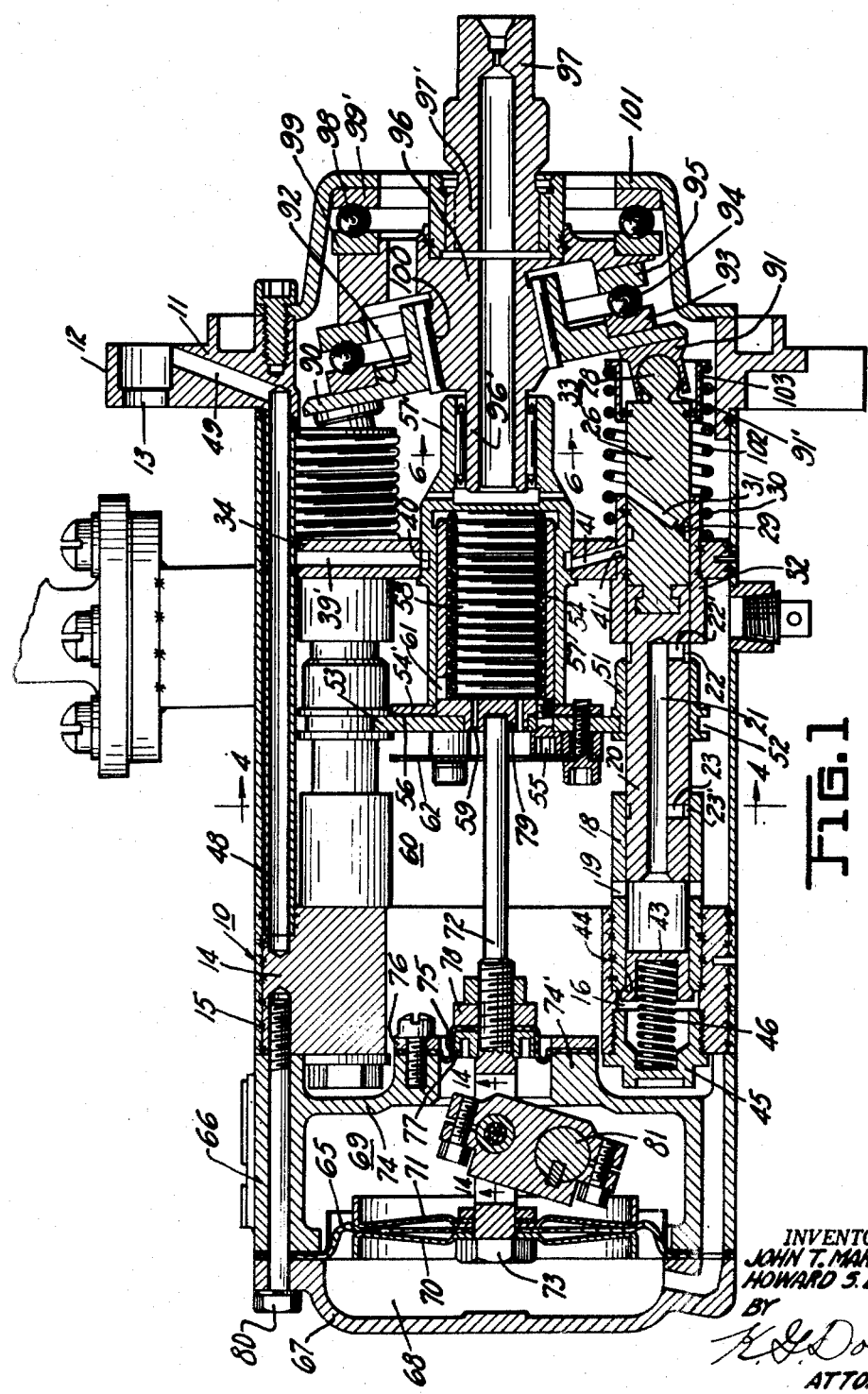
Figure 1 is a substantially central longitudinal sectional view of a fuel injection pump in accordance with the invention.
Figure 14:
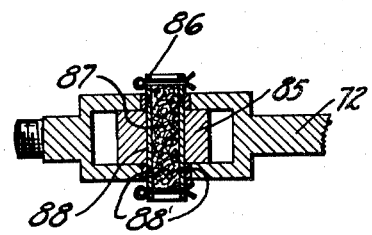
Figure 7:
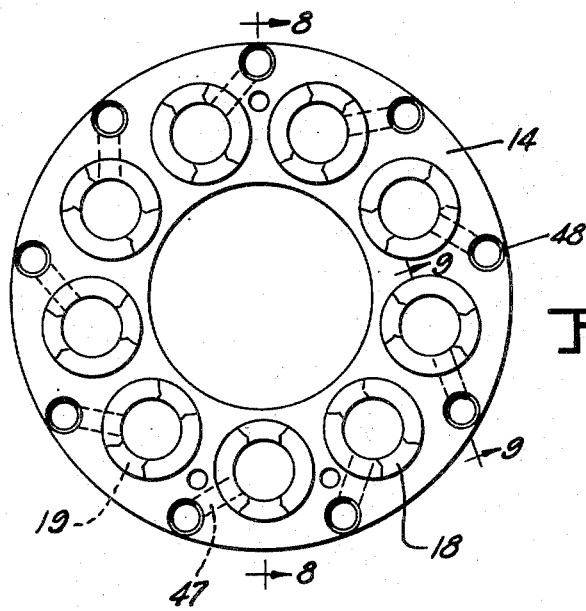
Figure 7 is a detail view in elevation of the plunger housing.
Figure 9:
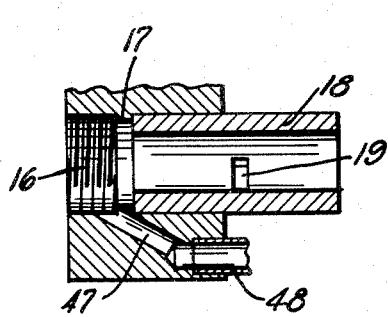
Figure 8:
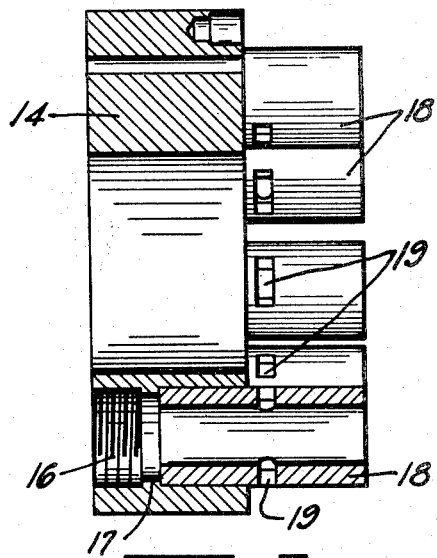

Figures 8 and 9 are sectional views taken on the lines 8—8 and 9—9, Figure 7;

Figure 10 is a detail view in elevation of the tappet housing;

Figures 11 and 12 are sectional views taken on the lines 11—11 and 12—12, Figure 10;

Figure 13 is a disassembled perspective of one of the plungers and its associated tappet; and Figure 14 is a fragmentary section taken on the line 14—14, Figure 1.

Referring to the drawings in detail, the main exterior pump body housing is indicated at 10; it comprises a suitable length of tubing, preferably weldable metal having the requisite strength. In practice, steel tubing of relatively thin wall section has proved satisfactory. At one end thereof (the right-hand end in Figure 1) the tubular housing 10 has secured thereto, preferably by welding, a mounting flange 11 provided with a plurality of radially projecting bosses 12 formed with bolt holes 13. A plunger housing 14 of annular or ring-shaped formation is secured interiorly of the opposite end of the tubular body 10; it is preferably machined from a piece of weldable metal bar stock such as steel and welded in place at 15. The plunger housing has machined therein a series of holes 16, note Figures 7, 8 and 9, which are recessed at the inner ends thereof as indicated at 17 and internally threaded at their outer ends. A series of hollow plunger bushings or cylinders 18 are inserted in the recesses 17, each preferably being made of weldable metal and secured in place by welding and each being provided with a plurality of intake ports 19.

There is a plunger and tappet assembly for each engine cylinder to be supplied with fuel and all are of similar construction. Each assembly comprises a plunger 20, see Figure 13, having a center bore defining an intake passage 21 receiving fuel through an annular groove 22 and radial ports 22'. Radial ports 23 communicating with annular groove 23' function to determine by their location with respect to the ports 19 in the bushing 18 the end of injection before the end of the actual plunger stroke, and these ports 23 also feed fuel as a lubricant to the exterior surface of the plunger where the latter reciprocates in the said bushing. At its outer end (right-hand end in Figure 1) each plunger has machined therein an undercut recess 24 (see also Figure 13) which opens outwardly through a slot 25. The plunger tappet is indicated at 26; it is provided with a reduced undercut boss 27 at its inner end adapted to be inserted through the slot 25 and removably engage in the recess 24, and at its outer end it is provided with a ball shaped bearing head 28. The body of the tappet is provided with an annular oil groove 29 for lubricating the tappet where it reciprocates in the tappet bushing 32, oil being supplied to each tappet groove in a manner to be described and flowing from the groove through a diagonal bore or passage 31 into an oil sump or drain chamber 33. The passage 31 is shown provided with a restriction 30 which may be added if the flow through the lubricant or oil passages becomes excessive.

The interlocking engagement between the plunger and tappet permitted by the recess 24 and the undercut boss 27 provides a positive axial connection while at the same time the tappet and plunger are free for relative rotary or angular movement; also, some misalignment is permitted due to the slightly rounded bearing surface contour of the head 27 and the slot in which it is received.

A tappet housing or supporting member is indicated at 34; it preferably consists of an annular disc shaped piece of weldable metal such as steel cut from bar stock and machined to provide a plurality of through holes 35 in which the tappet bushings 32 are inserted and welded to the housing, see Figures 10 and 11; also, the tappet housing 34 is preferably welded at its peripheral surface to the adjacent surface of the main tubular body 10.

Figure 5:
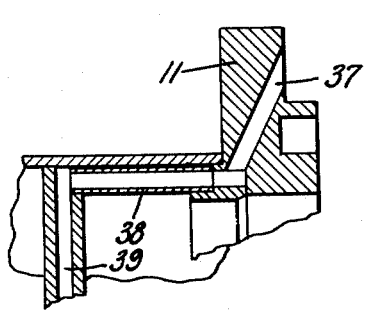
Figure 5 is a fragmentary section on the line 5—5, Figure 3.

Oil under pressure is supplied to the respective tappets through an inlet passage 37 in the mounting flange 11, see Figure 5, and then by way of oil tube 38 to passages 39 and 39' in the tappet housing 34, see Figure 12, and annular groove 40 provided in a by-pass control bushing 57, Figure 1, to be described; and from this groove the oil feeds radially outwardly through registering passages 41 and 41' formed in the tappet housing 34 and tappet bushing 32, respectively. When the groove 29 formed in each tappet registers with the hole 41' formed in each bushing 32, the oil passes around said groove 29 and effects its lubricating function. This construction lends itself to a number of different ways to control the amount of flow to effect lubrication other than by means of the restriction 30, which may be so small as to have a tendency to clog and impede circulation. Thus, the amount of flow may be regulated by the area and/or relative location of the port 41' in bushing 32 and the annular groove 29 in the tappet 26 together with the area and/or angular disposition of the passage 31 to bring its discharge or outlet end varying distances from the adjacent end of said bushing; the quantity of oil being passed into groove 29 varying with the time in which it is open to port 41', and since this intake must be passed to the chamber or reservoir 33 to proportionally vary the quantity of flow, the area and angular disposition of the passage 31 should be such as to accommodate the amount of oil taken in by the groove 29.

A check valve 43 is mounted in the discharge end of each plunger cylinder or bushing 18, at which point a seat 44 is provided for the outwardly tapering seating portion of said valve. A seal nut or plug 45 is threaded into the outer end of each cylinder 18, and a spring 46 seats at one end in said nut or plug and at its opposite end engages the check valve and normally urges it to seated position. The pressure stroke of each plunger in Figure 1 is to the left, at which time valve 43 is unseated against the opening pressure of the fuel injection nozzle, not shown, and fuel is discharged into the chamber defined by each of the holes 16 and then flows by way of passage 47, compare Figure 9 with Figure 1, to tube 48 which at its one end registers with said passage 47 and at its opposite end with a passage 49 formed in each of the radial bosses 13 of the mounting flange 11. There is a passage 47, tube 48 and passage 49 for each plunger and for each cylinder of the engine to be supplied with fuel, suitable fuel lines and coacting connections, not shown, communicating the passages 49 with the injection nozzles, also not shown.

With the type of check valve assembly shown, the plunger cylinder is sealed at its outer end by the plug or cap 45 contacting the rugged plunger housing 14 and without exerting any pressure on the bushing 18, with attendant liability of deforming said bushing and causing seizing of the plungers 20.

The effective charge delivery of the respective pumping plungers is controlled generally in the manner disclosed in the Evans application heretofore noted but the mechanism for accomplishing the result has been simplified. Each pump plunger has slidingly mounted thereon a by-pass sleeve 51 provided with an annular groove 52 in which the outer contoured edge of a supporting and adjusting plate 53 engages. Preferably, there is an individual plate 53 for each sleeve 51, the respective plates being secured to the flanged end 54' of a cylindrical sleeve 54 by means of screws 55 and projecting radially therefrom. Shims 56, which are preferably of substantially the same contour and dimensions as the plates 53, are interposed between the latter and the flanged end of the sleeve to provide for adjustment.

The sleeve 54 is mounted for sliding movement in by-pass control cylinder or bushing 57, see Figure 1, which projects through an axial opening in the tappet housing 34 and is rigidly secured to the housing, preferably by welding, said bushing being provided with a bearing hub 57'. A by-pass control spring 58 is mounted within the sleeve 54 and normally urges the by-pass control sleeves 51 in a charge decreasing direction, which in Figure 1 is toward the left. The closed end of the sleeve 54 is vented at 59 to metered fuel chamber 60, and said sleeve is also ported at 61 to effect proper lubrication of the exterior surface of the sleeve where it slides in the bushing 57.

It is desirable that the screws 55 be locked against loosening, and to avoid the tedious job of lock wiring the relatively numerous screws 55, a plate 62 lined with rubber or other suitable depressible or resilient material is anchored by means of screws 63 to the flange 54' and is adjustable against the heads of the screws 55. Since there need be only a relatively few of the screws 63 (and which are more easily accessible than the screws 55) these may be quickly and conveniently lock wired if such is deemed necessary. It will be noted that in the particular case of a nine plunger pump only three of the screws 63 are used, and at these three points, they replace the screws 55.

The position of the by-pass sleeves 51 determines the quantity of fuel comprised in each charge delivered by the pumping plungers 20, and the effective position of these sleeves is a function of the flow of fuel and air to the engine as described in the said Evans application. A diaphragm 65 has its outer or peripheral edge portion clamped between a control housing 66 and end cap or cover 67 and forms a movable wall between Venturi suction chamber 68 and fuel pressure chamber 69. The central area of the diaphragm is clamped between a pair of stiffening plates 70 and 71 which guide the diaphragm and are connected to the outer enlarged flanged end of a control shaft 72 by end nut 73. The shaft projects through an axial opening formed in a partition wall 74, at which point a sealing diaphragm 75 is clamped at its outer edge between an annular boss 74' formed on the wall 74 and an annular member 76, and at its central area is connected to the shaft 72 by means of a bushing 77 and nut 78. The shaft 72 projects through the chamber 60 and at its inner end engages in a socket formed in a boss or annular hub 79 projecting from the adjacent end wall of the sleeve 54.

Figure 2:
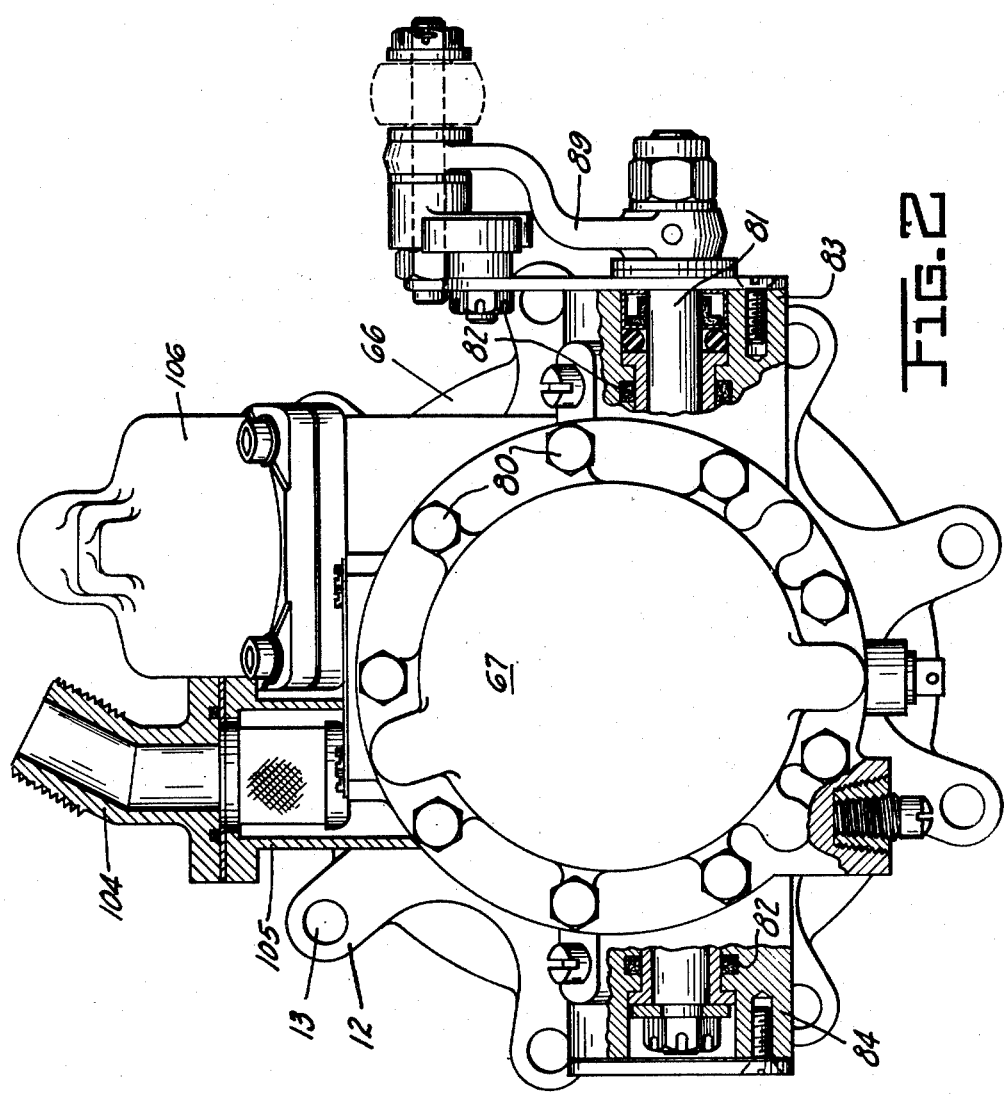
Figure 2 is a view in end elevation, partly in section, of the pump of Figure 1 as viewed from the left of the latter figure.
Figure 3:
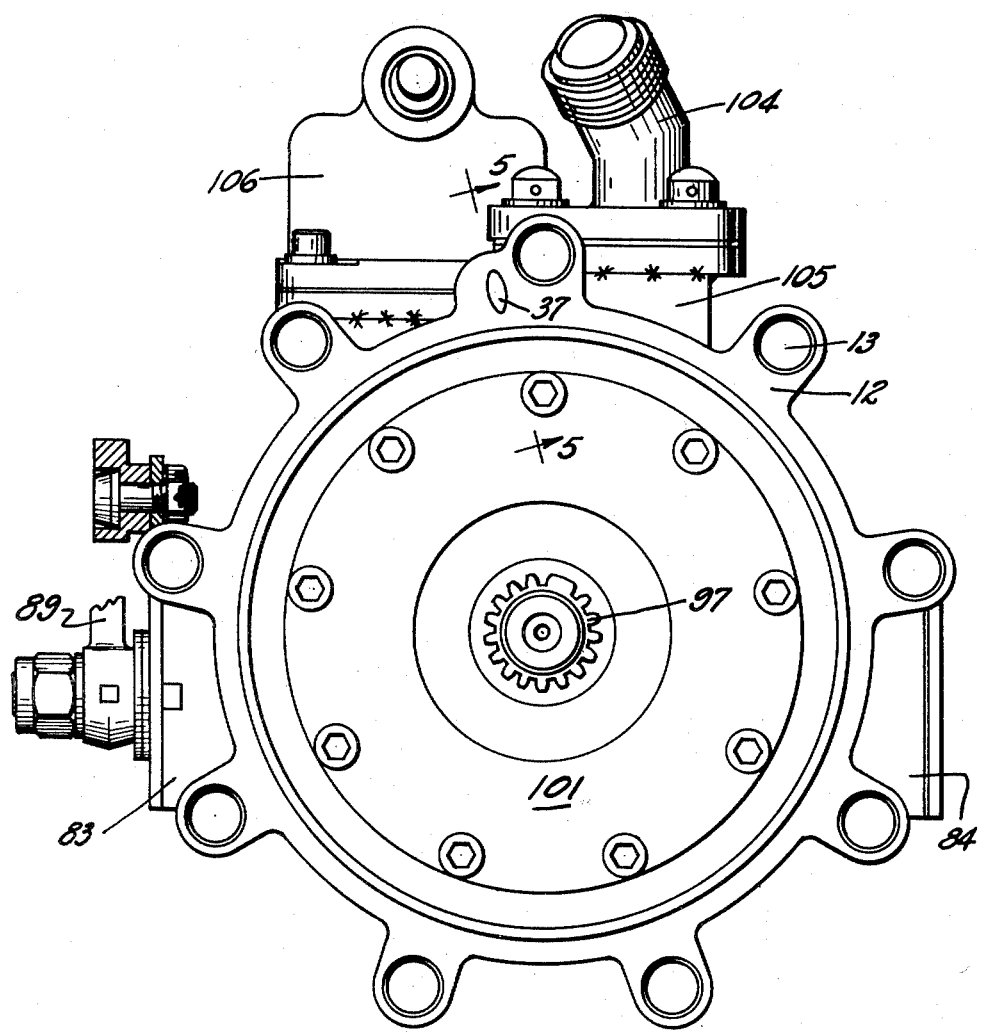
Figure 3 is a view similar to Figure 2 but entirely in elevation and looking from the right-hand end of Figure 1.
Figure 4:
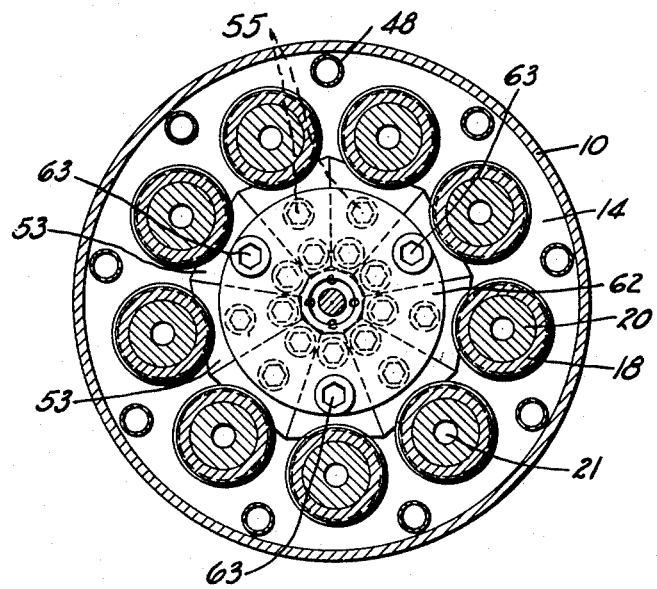
Figure 4 is a section taken on the line 4—4, Figure 1.

The control housing 66 and end cover 67 may be and preferably are castings; they are secured to the plunger housing 14 by means of screw bolts 80.

Where two or more pumps are used for one engine, as for example where so-called right and left hand pumps are to be installed for two banks of engine cylinders, it becomes necessary to synchronize the pumps. Accordingly, a shaft 81 has its opposite ends journaled in sealed bearings 82, see Figure 2, mounted in hollow bearing bosses 83 and 84 projecting from the control housing 66, and at its intermediate portion the shaft is adjustably connected to a yoke shaped part of the control rod or shaft 72 by means of a lever or clamp bracket 85 and hollow pin 86. This hollow pin is filled with absorbent material 87 saturated with a lubricant, the latter seeping to bushing 88, see Figure 14, through a plurality of through holes 88' in pin 86. A control lever 89, see Figure 2, is connected to the outer projecting end of the shaft 81 and is adapted to be connected to a similar lever on another pump, not shown, by means of a suitable link rod, also not shown.

Where right and left hand pumps are used, they are generally synchronized at the time of installation on the engine, and means for accurately setting and indexing the synchronizing mechanism is provided although not here shown since such means forms no part of the present invention. It should be noted, however, that where a plurality of pumps are connected to operate in timed relation, one pump only need necessarily be provided with a main control or power diaphragm 65, or one diaphragm of suitable effective area may serve two or more pumps.

Figure 6:
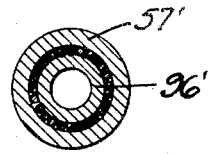
Figure 6 is a section taken on the line 6—6, Figure 1.

The means for actuating the pump plungers is mounted in the chamber 33. The pumping stroke of the respective plungers is effected by a wobble plate 90 whose hardened active cam surface is adapted to engage tappet shoes 91 journaled on the heads 28 of the tappets 26 and held loosely in place for assembly purposes by a split spring ring 91'. The back of the wobble plate is provided with an annular recess 92 which receives the inner race 93 of a thrust bearing 94, the outer race 95 of said bearing being engaged by the active surface of a cam 96 splined to the hub portion 97' of a drive or spline pinion 97, the said cam also having a bearing hub 96' projecting into the hub 57' of the member 57, see Figure 6. Another thrust bearing 98 has its inner race 99 seated in a recess formed in the adjacent surface of the cam 96 and its outer race 99' backed up by end cap 101. A radial bearing 100 is mounted between the body of the cam 96 and the wobble plate 90.

When the cam 96 is rotated, a substantially direct axial thrust is applied to the wobble plate 90 through the bearing 94, thereby imparting a pumping stroke to the pump plungers in sequential order against the return force of springs 102 which encircle the tappets 26 and are held in place by spring retainer 103. By having the bearing and wobble plate assembly arranged and constructed in the manner shown, the load is applied to the bearings in a substantially straight line instead of having combined axial and oblique thrust components which tend to materially shorten the life of the bearings.

Metered fuel is admitted to the pump by way of conduit connection 104 which is secured to the flanged wall of a hollow strainer chamber 105, see Figure 2. The part indicated at 106 houses an inverted flight valve and float assembly for normally releasing vapor and for closing the vapor outlet or vent line when the pump is in an inverted position during flight of an aircraft.

The pump operates as follows:

Assuming the spline pinion 97 is connected up to be driven by the engine to be supplied with fuel, rotation of this pinion imparts a pumping stroke to the respective pumping plungers in sequence against the resistance of the return springs 102. Metered fuel from a suitable control member unit such as that disclosed in the Evans application heretofore noted flows to the pump through the conduit 104 and fills the chambers 60 and flows from the latter to the diaphragm chamber 68. Also, Venturi suction is communicated to chamber 69 and in conjunction with the metered fuel pressure acting on the diaphragm 65, tends to move the by-pass sleeves 51 to the right against the resistance of the spring 58, the travel of said sleeves being in direct relation to the force exerted by metered fuel pressure and Venturi suction. The further the by-pass sleeves are to the right as shown in Figure 1, the longer will be the period of movement of the intake ports 22' in the said sleeves, so that during the working stroke of each plunger, the less chance the fuel will have to escape from the cylinders 18. While the plungers are retracted, and/or during the dwell period of the respective plungers, fuel will pass into the plunger cylinders 18 through the intake ports 19 and also through the ports 22' and passage 21. In the position shown in Figure 1, the plunger is retracted ready to make an injection or pumping stroke. When the pumping stroke takes place, the fuel will have an opportunity to escape back through the passage 21 and ports 22' as long as the by-pass sleeves 51 fail to close the ports 22'. The location of the ports 19 with respect to the fully retracted position of each plunger determines in part the quantity of each charge, while the location of the annular groove 23 and port 23' with respect to the ports 19 determine the end of injection.

Generally speaking, the operation of the pump is similar in principle to the operation of the Evans pump heretofore noted. The present pump, however, has certain outstanding advantages, among which may be mentioned the following:

The pump body being made of steel tubing cut to length and welded to the bolting on mounting flange provides a housing which is light in weight, yet at the same time has considerable strength.

The pump body, plungers and housing and tappet housing are all made of weldable material such as steel, and not only may these parts be readily welded into a strong and rugged assembly, but each has uniform expansion and contraction characteristics, so that there is less tendency for the parts to depart from their original specified dimensions and become misaligned and relatively unproportioned and thereby affect uniformity and consistency of the pump output, either by the entire group of plungers or one plunger with respect to another.

The pump as a whole may be made relatively small and light in weight, which is of tremendous importance in the aircraft industry.

The wobble plate bearing assembly, due to the manner in which it takes the load in a substantially straight line, is capable of long life and smooth efficient service.

It will be obvious that features of importance other than those expressly enumerated herein are present in the improved pump, and also that certain limited changes in construction and design may be adopted within the scope of the invention as defined by the appended claims.

We claim:

1. In a fuel injection pump, a length of weldable steel tubing defining an outer shell or body housing, a mounting flange secured to one end of said shell, a substantially cylindrical plunger housing comprised of a piece of machined bar stock welded to the interior surface of said shell in the opposite end of the latter, a tappet housing also comprised of a piece of machined bar stock welded to the interior of the shell in spaced aligned relation to said plunger housing, said plunger and tappet housings each having a plurality of annularly arranged aligned openings therein, plunger cylinders and tappet bushings of weldable metal mounted in said openings and welded to the walls which define the openings, a series of pumping plungers and associated tappets slidably mounted in said plunger cylinders and tappet bushings, check valves mounted in the plunger cylinders and adapted to be displaced by fluid pressure at each pumping stroke of an associated plunger, said plunger housing being formed with discharge passages receiving fuel discharged from said plunger cylinder, tubes communicating at one end with and forming continuations of said passages, said tubes being secured to the interior of said shell, said mounting flange having fuel discharge passages communicating with the discharge ends of said tubes.

2. In a fuel injection pump, a main outer shell, a plunger housing and a tappet housing disposed in spaced aligned relation in the shell, pumping plungers and associated tappets supported by said housings, said plungers being provided with fuel intake ports, by-pass sleeves slidable on said plungers for regulating the intake of fuel at each stroke of the plungers, a hollow bushing projecting into the center of said tappet housing and secured to the latter, a guide sleeve slidably mounted in said bushing, a spring in said bushing, means for positioning said by-pass sleeves including a pressure responsive member such as a diaphragm and means connecting said diaphragm with said guide sleeve and said by-pass sleeves, said spring opposing movement of said diaphragm in a direction tending to vary the intake of said plungers, and means associated with said tappets for imparting reciprocatory movement to said plunger.

3. In a fuel injection pump, a main outer shell, a mounting flange secured to one end of said shell, a cap removably secured to the mounting flange and closing the adjacent end of the shell, a plunger housing and a tappet housing disposed in spaced aligned relation in the shell, pumping plungers and associated tappets supported by said housings, said plungers being provided with fuel intake ports, by-pass sleeves slidable on said plungers for regulating the intake of fuel at each stroke of the plungers, a hollow bushing projecting into the center of the tappet housing and secured to the latter, a guide sleeve slidably mounted in said bushing, means for positioning said by-pass sleeves including a pressure responsive member such as a diaphragm and means connecting said diaphragm with said guide sleeve and by-pass sleeves, means associated with said tappets for imparting reciprocatory movement to said plungers including a wobble plate and a cam member for actuating the wobble plate, said cam member having a bearing portion rotatably supported by said bushing, and a driving member for said cam supported by said cap.

4. In a fuel injection pump, means defining a fuel chamber, a series of pumping plungers mounted to reciprocate in said chamber, plunger cylinders for said plungers, means for successively reciprocating said plungers, each of said cylinders having a fuel intake port communicating with said chamber, each of said ports being so located with respect to the travel of each plunger that the port will be uncovered by the end of the plunger when the latter is in a fully retracted position and admit fuel to the plunger cylinder, each of said plungers having a fuel port spaced from each cylinder and a longitudinal fuel flow passage communicating said latter port with the cylinder through the plunger, a by-pass sleeve in which each plunger has movement, said sleeve covering the port in the plunger during part of each injection stroke to determine the quantity of fuel permitted to escape from the cylinder during an injection stroke of each plunger, and each plunger being provided with an additional port communicating with said longitudinal flow passage and so located with respect to the fuel-intake port in the cylinder as to determine the end of injection and also effect lubrication of the plunger where it slides in said cylinder.

5. In a fuel injection pump, an outer shell, a plunger housing fixed in said shell at one extremity of the latter, a tappet housing fixed in said shell in spaced relation to the plunger housing, the tappet housing constituting in part a partition separating the interior of the pump into a fuel chamber and an oil sump or chamber, a series of plunger cylinders fixed in said plunger housing and projecting into the fuel chamber, a series of plungers mounted in the fuel chamber for reciprocatory movement in said cylinders, a tappet for each plunger, a bushing for each tappet fixed in said tappet housing, means associated with said tappets for imparting an injection stroke to the respective plungers, and springs encircling the tappets in the oil chamber for returning the plungers to a retracted position, said tappets having a positive push-pull connection with the plungers.

6. In a fuel injection pump, a plurality of injection plungers and associated tappets, each plunger and its coacting tappet being disposed in substantially aligned relation, the contiguous ends of each plunger and tappet being formed with an undercut recess open and accessible in a plane normal to the longitudinal axis of the plunger and tappet and a necked boss adapted to engage in said recess thereby providing a releasable yet positive push-pull connection between each tappet and plunger, cam means for imparting an injection stroke to each plunger, and resilient means acting on said tappets for retracting the plungers.

7. In a fuel injection pump, an outer shell, a plunger housing fixed in said shell at one extremity of the latter, a tappet housing fixed in said shell in spaced relation to the plunger housing, the tappet housing constituting in part a partition separating the interior of the pump into a fuel chamber and an oil chamber, a series of plunger cylinders fixed in said plunger housing, a series of plungers mounted for reciprocatory movement in said cylinders, a tappet for each plunger, a bushing for each tappet fixed in said tappet housing, means associated with said tappets for imparting an injection stroke to the respective plungers, said tappet housing being provided with an oil flow passage and said tappet bushing being formed with a port defining a continuation of said passage for admitting a lubricant to the bearing surface of the tappet, and said tappet being also formed with an oil flow passage for communicating the port in the tappet bushing with said oil chamber.

8. The combination of parts in a fuel injection pump as claimed in claim 7 wherein the oil flow passage in the tappet bushing is provided with a restriction which determines the rate of oil flow.

9. In a fuel injection pump, an outer shell, a plunger housing fixed in said shell at one extremity of the latter, a tappet housing fixed in said shell in spaced relation to the plunger housing, the tappet housing constituting in part a partition separating the interior of the pump into a fuel chamber and an oil chamber, a series of plunger cylinders fixed in said plunger housing, a series of plungers mounted for reciprocatory movement in said cylinders, a tappet for each plunger, a bushing for each tappet fixed in said tappet housing, means associated with said tappets for imparting an injection stroke to the respective plungers, said tappet housing being provided with an oil flow passage and said tappet bushing being formed with a port defining a continuation of said passage for admitting a lubricant to the bearing surface of the tappet, and said tappet being also formed with an annular groove adapted to register with the port in the tappet bushing during each stroke of the tappet and a flow passage for communicating said groove with said oil chamber.

10. In a fuel injection pump, means defining a fuel chamber, a series of pumping plungers mounted to reciprocate in said chamber, plunger cylinders for said plungers, means for successively reciprocating said plungers in their cylinders, each of said cylinders having a fuel intake port communicating with said chamber, each of said plungers having a fuel port adapted to communicate with said chamber over a predetermined length of travel of the plunger during an injection stroke of the latter, a by-pass sleeve in which each plunger has reciprocatory movement for determining the quantity of fuel permitted to escape from the plunger cylinder through said fuel port in the plunger during a pumping stroke, the port in each cylinder being so located with respect to the stroke of each plunger that the end of the plunger will uncover the said latter port when the plunger is in a fully retracted position, and means for automatically positioning said by-pass sleeves, each plunger being provided with an additional port so located as to be closed by the plunger cylinder during a pumping stroke until it registers with said fuel intake port in said cylinder, whereupon fuel may escape to the fuel chamber, to thereby determine the end of injection before the end of the actual stroke of the plunger the said additional port being in communication with said fuel intake port and also functioning to feed fuel as a lubricant to the exterior surface of the plunger where the latter reciprocates in said cylinder.

JOHN T. MARSHALL.
HOWARD S. BOWER.

REFERENCES CITED

The following references are of record in the file of this patent:

UNITED STATES PATENTS

| Number | Name | Date |
|---|---|---|
| 2,388,462 | Beeh | Nov. 6, 1945 |
| 2,393,544 | Lum | Jan. 22, 1946 |
| 2,413,115 | Sheehan | Dec. 24, 1946 |
| 2,433,222 | Huber | Dec. 23, 1947 |
| 2,436,797 | Deschamps et al. | Mar. 2, 1948 |
| 2,447,268 | Evans | Aug. 17, 1948 |

FOREIGN PATENTS

| Number | Country | Date |
|---|---|---|
| 147,142 | Great Britain | 1920 |